United States Patent Office 3,381,032
Patented Apr. 30, 1968

3,381,032
PREPARATION OF 3,5-DIBROMO-
SALICYLIC ACID
William R. Surine, Bay City, and Theodore E. Majewski, Midland, Mich., assignors to The Dow Chemical Company, Midland, Mich., a corporation of Delaware
No Drawing. Filed Sept. 9, 1965, Ser. No. 486,200
5 Claims. (Cl. 260—521)

This invention relates to an improved bromination process and it is particularly concerned with such a process as applied to the production of 3,5-dibromosalicylic acid.

This compound which finds its principal use as a chemical intermediate has been conventionally prepared by reacting salicylic acid with about the theoretical quantity of liquid bromine in the presence of a bromination process solvent at about 20–100° C. Known bromination process solvents such as glacial acetic acid or chloroform have been used as the reaction medium. This prior art method produces 3,5-dibromosalicylic acid in fair yields, but the crude product is contaminated by significant quantities of other brominated products particularly the monobrominated acid and tribromophenol. In order to obtain a product of good quality, therefore, the crude material must be subjected to expensive purification techniques such as recrystallization from a solvent with the result that high yields of the purified compound are not easily attainable.

It has now been discovered that when the above bromination process is carried out in a reaction medium consisting of aqueous p-dioxane of a defined composition, nearly quantitative yields of 3,5-dibromosalicylic acid are easily recoverable from the reaction mixture as the essentially pure compound. Surprisingly, the product of this improved process as it is initially recovered contains only traces at most of monobromosalicylic acid and other impurities usually found in 3,5-dibromosalicylic acid prepared by known methods and the careful purification formerly necessary to obtain a product of high quality is no longer required.

This new result is obtained when the bromination process is run in aqueous p-dioxane containing 10–70 percent by weight of water. This proportion of water has been found to be sufficient to promote the bromination to the dibromosalicylic acid stage but insufficient to cause the decarboxylation which takes place in essentially aqueous systems and which results in the formation of the troublesome tribromophenol impurity. As additional advantage is the fact that the byproduct HBr remains dissolved and no acid scrubber is required. As the water content of the reaction medium is increased above about 70 percent, the quality of the product declines markedly. Similarly, when the proportion of water is reduced below about 10 percent, both the purity of the product and the quantity recoverable by simple crystallization from the reaction mixture are adversely affected. Best results are found when the aqueous p-dioxane medium contains more than 15 percent but less than 60 percent of water.

For either continuous or batchwise operation of the process, the reaction solvent is conveniently recycled to the process after neutralization and distillation. The inorganic bromide obtained by neutralization of the process mother liquor with caustic soda or other such base provides a ready means for bromine recovery. Recovery of reaction solvent by distillation is facilitated by the fact that p-dioxane forms a water azeotrope containing about 80% of p-dioxane and boiling at about 88° C.

For practical operation of this process, about 0.3–2 liters of aqueous p-dioxane are used per gram mole of salicylic acid.

The reaction is best substantially accomplished at a temperature above about 40° C., preferably between 50° C. and 100° C.

The highest quality of 3,5-dibromosalicylic acid and the most efficient use of bromine are obtained by using 2–2.2 moles of bromine per mole of salicylic acid.

The operation of this improved process can be by any conventional bromination procedure under the conditions as outlined above. A preferred procedure comprises adding the bromine portionwise to the reaction solution or suspension at about 20–100° C. and then maintaining the reaction mixture at about 90–100° C., conveniently at its reflux temperature, for an additional period after the bromine has been added in order to insure complete reaction and form a substantially homogeneous solution. Total reaction times of 0.5–5 hours are typical. Cooling the reaction mixture then below 90° C., preferably to about room temperature, causes crystallization of substantially all of the 3,5-dibromosalicylic acid product as the essentially pure compound from the reaction mixture. The separated crystals are preferably washed with water or with fresh reaction solvent and dried to obtain a product which is usually of better than 99% purity. Yields are commonly better than 90% based on the starting salicylic acid.

EXAMPLE 1

To a mixture of 69 g. of salicylic acid and 238 g. of 82% aqueous p-dioxane there was added 170 g. of liquid bromine over a period of 1.5 hours. The reaction mixture was maintained at 80–83° C. during the addition, then it was heated at reflux temperature for one hour. The mixture was cooled to 25° C., whereupon crystalline reaction product was precipitated essentially quantitatively. The separated product was washed with water and dried to obtain 145 g. of fine white crystals, M.P. 227–229° C. This material assayed better than 99% 3,5-dibromosalicylic acid.

EXAMPLE 2

A slurry of 276.2 g. of salicylic acid in 1200 ml. of 50% aqueous p-dioxane was stirred at room temperature while dropwise addition of liquid bromine was begun. The temperature of the mixture rose as the bromination reaction progressed and most of the reaction took place at 60–84° C. as a total of 645.9 g. of bromine was added in 40 minutes. The mixture was then heated at reflux temperature for about one-half hour. The reaction mixture was cooled and worked up as in Example 1 to obtain 572.7 g. of white crystalline 3,5-dibromosalicylic acid, M.P. 226.5–228° C. The quality of the product was similar to that of the product of Example 1, the impurities consisting essentially of 0.05% monobromosalicylic acid and 0.24% tribromophenol.

EXAMPLES 3–10

A series of runs was made as described in Example 2 except that the water content of the solvent was varied as shown. Water content is listed in volume percent (essentially the same as weight percent in this case).

| Ex. | Percent $H_2O$ | Dibromosalicylic Acid Product | | | |
|---|---|---|---|---|---|
| | | Wt., grams | M.P., °C. | Percent Mono [1] | Percent Tri [2] |
| 3 | 83 | 548.7 | 212–219 | 11.0 | 17.0 |
| 4 | 67 | 577.4 | 222–224.5 | 1.0 | 2.9 |
| 5 | 58 | 572.9 | 224–226.5 | .33 | .96 |
| 6 | 42 | 571.5 | 226.5–227.5 | .09 | .09 |
| 7 | 33 | 561.9 | 226.5–227.5 | .27 | .07 |
| 8 | 25 | 515.7 | 225.5–227 | .40 | .06 |
| 9 | 8 | 151.0 | 219–222 | 4.6 | <.05 |
| 10 | [3] 0 | 380.5 | 196–214 | | |

[1] Monobromosalicylic acid.
[2] Tribromophenol.
[3] 450 ml. of p-dioxane used.

We claim:

1. In a process for making 3,5-dibromosalicylic acid by reacting salicylic acid with about two mole equivalents of bromine in the presence of a solvent, the improvement wherein said solvent is aqueous p-dioxane containing 10–70 percent of water.

2. The process of claim 1 wherein the salicylic acid is reacted with bromine at about 20° C. to about 100° C.

3. The process of claim 1 wherein the aqueous p-dioxane contains 15–60 percent of water.

4. The process of claim 3 wherein the salicylic acid-bromine reaction is effected substantially at 50–100° C.

5. A process for making 3,5-dibromosalicylic acid which comprises forming a reaction mixture by adding 2–2.2 moles of bromine to a mole of salicylic acid at 20–100° C. in the presence of a reaction solvent consisting essentially of aqueous p-dioxane containing 10–70 percent of water, maintaining said reaction mixture at 90–100° C. until essentially all of the bromine has reacted, cooling the reaction mixture below 90° C. and separating therefrom 3,5-dibromosalicylic acid.

References Cited

UNITED STATES PATENTS 3,152,177   10/1964   Majewski _____ 260—559

OTHER REFERENCES

Lellmann et al., Berichte, vol. 17 (1884), p. 2728.
Robertson, J. Chem. Soc. (London), vol. 81 (1902), p. 1480.

HENRY R. JILES, *Primary Examiner.*

JAMES H. NIELSEN, *Assistant Examiner.*